US012658020B2

(12) United States Patent
Bard et al.

(10) Patent No.: US 12,658,020 B2
(45) Date of Patent: Jun. 16, 2026

(54) PREDICTIVE NOISE LEVEL IDENTIFICATION AND AUTOMATIC WARNING

(71) Applicant: International Business Machines Corporation, Armonk, NY (US)

(72) Inventors: Seth Elijah Bard, Poughkeepsie, NY (US); Camillo Sassano, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 18/775,097

(22) Filed: Jul. 17, 2024

(65) Prior Publication Data

US 2026/0024428 A1 Jan. 22, 2026

(51) Int. Cl.
G08B 21/18 (2006.01)
G01M 99/00 (2011.01)
H04L 41/069 (2022.01)

(52) U.S. Cl.
CPC ......... G08B 21/182 (2013.01); G01M 99/005 (2013.01); H04L 41/069 (2013.01)

(58) Field of Classification Search
CPC ... G08B 21/182; G01M 99/005; H04L 41/069
USPC ....................................................... 340/635
See application file for complete search history.

(56) References Cited

U.S. PATENT DOCUMENTS 9,164,805 B2 * 10/2015 Alshinnawi ......... H04L 41/0897
9,175,827 B2 11/2015 Clore 9,848,269 B2 * 12/2017 Eberbach ................ G08B 21/02
10,446,168 B2 * 10/2019 Benway ................ H04R 1/1083
11,181,417 B2 11/2021 Wang
11,604,091 B1 * 3/2023 Kim .......................... G01S 7/534
11,644,801 B2 5/2023 Kishore et al.
2007/0109763 A1 5/2007 Wolf et al.
2008/0159553 A1 * 7/2008 Copley ............ G10K 11/17854
381/71.1
2017/0188166 A1 * 6/2017 Eberbach ............. H04R 29/008
2018/0359555 A1 * 12/2018 Jenkins .................... G01H 3/12
(Continued)

OTHER PUBLICATIONS

Amazon, "32-Bit Music Level Indicator Light, Voice Sound Control Pickup Rhythm LED Light, Colorful Pulse Signal Display Rhythm RGB Light Bar," URL: http://tinyurl.com/5n8xrzdx, Retrieved: Jan. 18, 2024, 4 pages.

(Continued)

*Primary Examiner* — Zhen Y Wu
(74) *Attorney, Agent, or Firm* — CANTOR COLBURN LLP; Teddi Maranzano

(57) ABSTRACT

Computer-implemented methods for providing alerts of an estimated noise in a location are provided. Aspects include receiving operational characteristics from each of one or more of pieces of noise generating equipment in a location, inputting the operational characteristics into noise level models corresponding the one or more of pieces of noise generating equipment, and receiving a total estimated noise level for the location from the noise level model. Aspects also include comparing the total estimated noise level to one or more threshold levels and activating one or more alerts based on the comparison, wherein the one or more alerts indicate a risk level associated with exposure to the total estimated noise level.

15 Claims, 6 Drawing Sheets

(56) References Cited

U.S. PATENT DOCUMENTS

| | | | | |
|---|---|---|---|---|
| 2019/0155250 A1* | 5/2019 | Baba | .................. | G05B 19/4183 |
| 2021/0012788 A1* | 1/2021 | Karimian Azari | ..... | G08B 29/18 |
| 2022/0059112 A1* | 2/2022 | Iyer | .................... | G10L 21/0216 |
| 2022/0164746 A1 | 5/2022 | Kanukurthy et al. | | |
| 2023/0240055 A1* | 7/2023 | Bernat | .............. | H05K 7/20736 |
| 2023/0267909 A1* | 8/2023 | Muggleton | ............... | A61F 2/06 |
| | | | | 381/56 |
| 2024/0096306 A1* | 3/2024 | Hudman | ................ | G06F 1/163 |

OTHER PUBLICATIONS

Anonymous, "Proximity Based Acoustic Regulation of Server Rooms," IP.com No. IPCOM000266600D, Jul. 30, 2021, 8 pages.
B&H, "Galaxy Audio CM-170 Check Mate Series Type II SPL Meter," URL: http://tinyurl.com/4x6m8swa, Retrieved: Jan. 18, 2024, 3 pages.
CDC, "Noise and Occupational Hearing Loss," URL: https://www.cdc.gov/niosh/topics/noise/app.html, Retrieved: Jan. 18, 2024, 5 pages.
Global Industrial, "Accuform SCS601 Decibel Meter Sign, Caution Ear Protection Required, 12" x 10" x 1"," URL: https://www.globalindustrial.com/p/scs601-decibel-meter-sign?infoParam.campaignId=T9F, Retrieved: Jan. 18, 2024, 3 pages.
Noisemeters Inc., "doseBadge Industrial Noise Dosimeter," URL: http://tinyurl.com/3yzcs2a6, Retrieved: Jan. 18, 2024, 4 pages.
Noisemeters Inc., "Noise Activated Warning Sign—SoundEar Classic," URL: http://tinyurl.com/yhdjr8rw, Retrieved: Jan. 18, 2024, 3 pages.

* cited by examiner

100

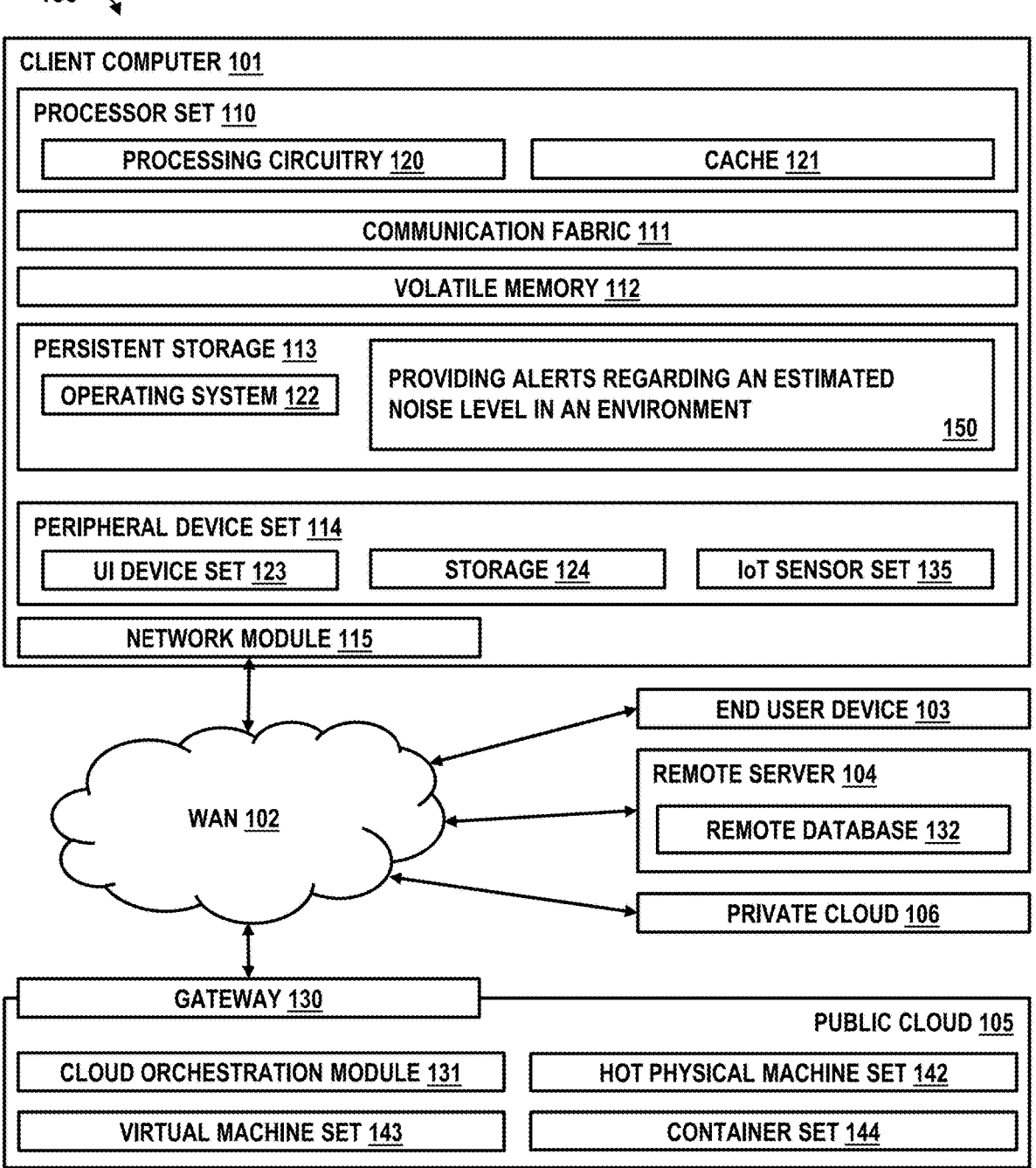

CLIENT COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

PROVIDING ALERTS REGARDING AN ESTIMATED NOISE LEVEL IN AN ENVIRONMENT
150

PERIPHERAL DEVICE SET 114

| UI DEVICE SET 123 | STORAGE 124 | IoT SENSOR SET 135 |

NETWORK MODULE 115

WAN 102

END USER DEVICE 103

REMOTE SERVER 104

REMOTE DATABASE 132

PRIVATE CLOUD 106

GATEWAY 130

PUBLIC CLOUD 105

CLOUD ORCHESTRATION MODULE 131

HOT PHYSICAL MACHINE SET 142

VIRTUAL MACHINE SET 143

CONTAINER SET 144

*FIG. 1*

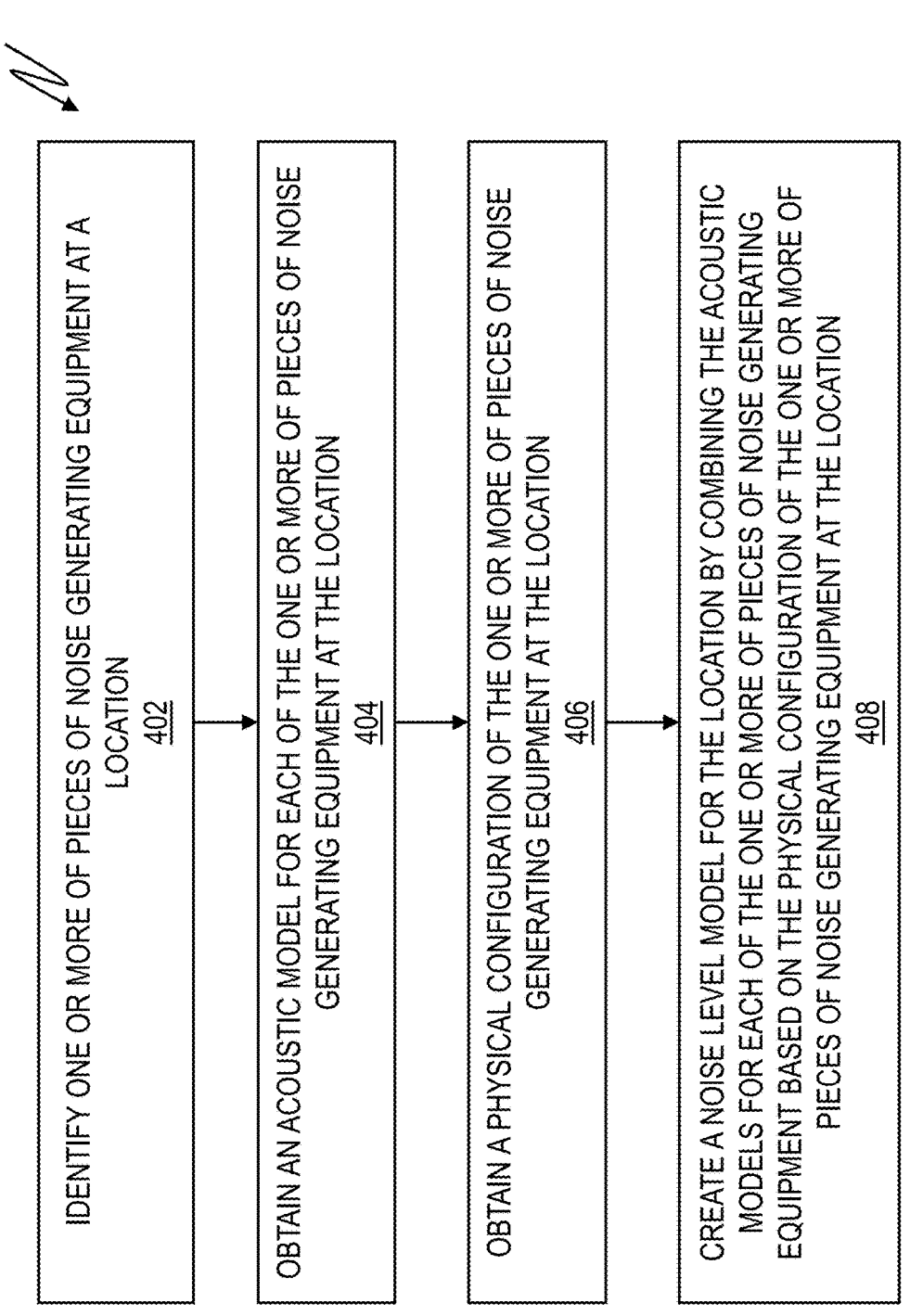

400

IDENTIFY ONE OR MORE OF PIECES OF NOISE GENERATING EQUIPMENT AT A LOCATION
402

OBTAIN AN ACOUSTIC MODEL FOR EACH OF THE ONE OR MORE OF PIECES OF NOISE GENERATING EQUIPMENT AT THE LOCATION
404

OBTAIN A PHYSICAL CONFIGURATION OF THE ONE OR MORE OF PIECES OF NOISE GENERATING EQUIPMENT AT THE LOCATION
406

CREATE A NOISE LEVEL MODEL FOR THE LOCATION BY COMBINING THE ACOUSTIC MODELS FOR EACH OF THE ONE OR MORE OF PIECES OF NOISE GENERATING EQUIPMENT BASED ON THE PHYSICAL CONFIGURATION OF THE ONE OR MORE OF PIECES OF NOISE GENERATING EQUIPMENT AT THE LOCATION
408

FIG. 4

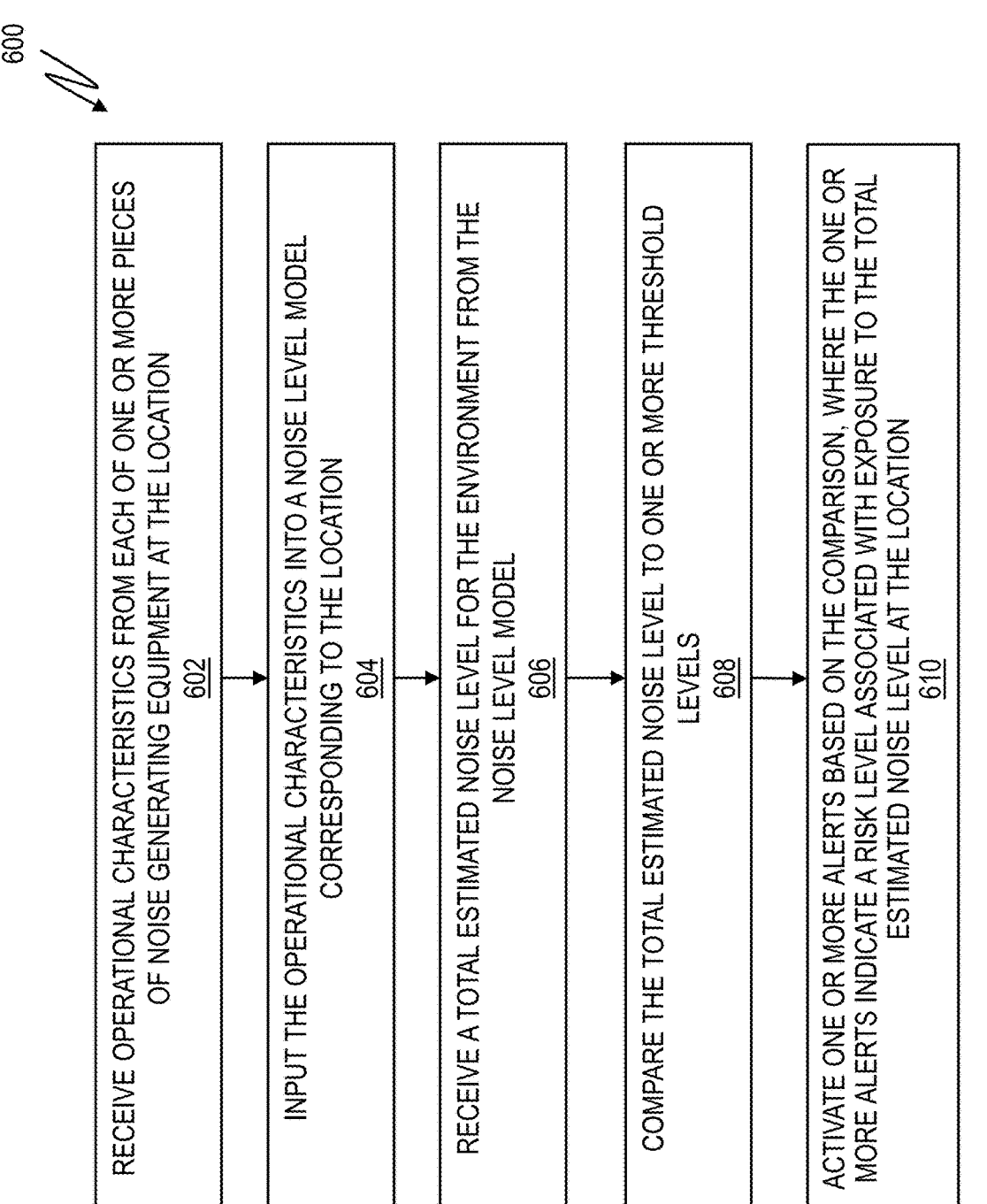

600

RECEIVE OPERATIONAL CHARACTERISTICS FROM EACH OF ONE OR MORE PIECES OF NOISE GENERATING EQUIPMENT AT THE LOCATION
602

INPUT THE OPERATIONAL CHARACTERISTICS INTO A NOISE LEVEL MODEL CORRESPONDING TO THE LOCATION
604

RECEIVE A TOTAL ESTIMATED NOISE LEVEL FOR THE ENVIRONMENT FROM THE NOISE LEVEL MODEL
606

COMPARE THE TOTAL ESTIMATED NOISE LEVEL TO ONE OR MORE THRESHOLD LEVELS
608

ACTIVATE ONE OR MORE ALERTS BASED ON THE COMPARISON, WHERE THE ONE OR MORE ALERTS INDICATE A RISK LEVEL ASSOCIATED WITH EXPOSURE TO THE TOTAL ESTIMATED NOISE LEVEL AT THE LOCATION
610

FIG. 6

PREDICTIVE NOISE LEVEL IDENTIFICATION AND AUTOMATIC WARNING

BACKGROUND

The present disclosure generally relates to noise level monitoring, and more specifically, to predictive noise level identification and automatic warning.

As power density has increased for servers and other information technology (IT) equipment in data centers, so have the noise emissions from air-moving devices rotating faster each generation. In some operating states, the noise generated by these systems can exceed noise regulation thresholds which would require the use of an informational safeguard, such as a safety label. However, in other operating states, the noise generated by these systems often falls below the noise regulation thresholds. Accordingly, the use of static safety labels may lead to a false impression of the risks associated with typical and current operations because the safety labels convey information about the worst-case noise emission.

SUMMARY

Embodiments of the present disclosure are directed to computer-implemented methods for providing alerts of an estimated noise in a location. According to an aspect, a computer-implemented method includes receiving operational characteristics from each of one or more of pieces of noise generating equipment in a location, inputting the operational characteristics into noise level models corresponding the one or more of pieces of noise generating equipment, and receiving a total estimated noise level for the location from the noise level model. The method also includes comparing the total estimated noise level to one or more threshold levels and activating one or more alerts based on the comparison, wherein the one or more alerts indicate a risk level associated with exposure to the total estimated noise level.

Embodiments also include computing systems and computer program products for providing alerts of an estimated noise in a location.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

FIG. 1 depicts a block diagram of an example computer system for use in conjunction with one or more embodiments of the present disclosure;

FIG. 4 depicts a flowchart of a method for creating a noise level model for a location in accordance with one or more embodiments of the present disclosure;

FIG. 6 depicts a flowchart of a method for providing alerts of an estimated noise in a location in accordance with one or more embodiments of the present disclosure.

DETAILED DESCRIPTION

Figure 2:
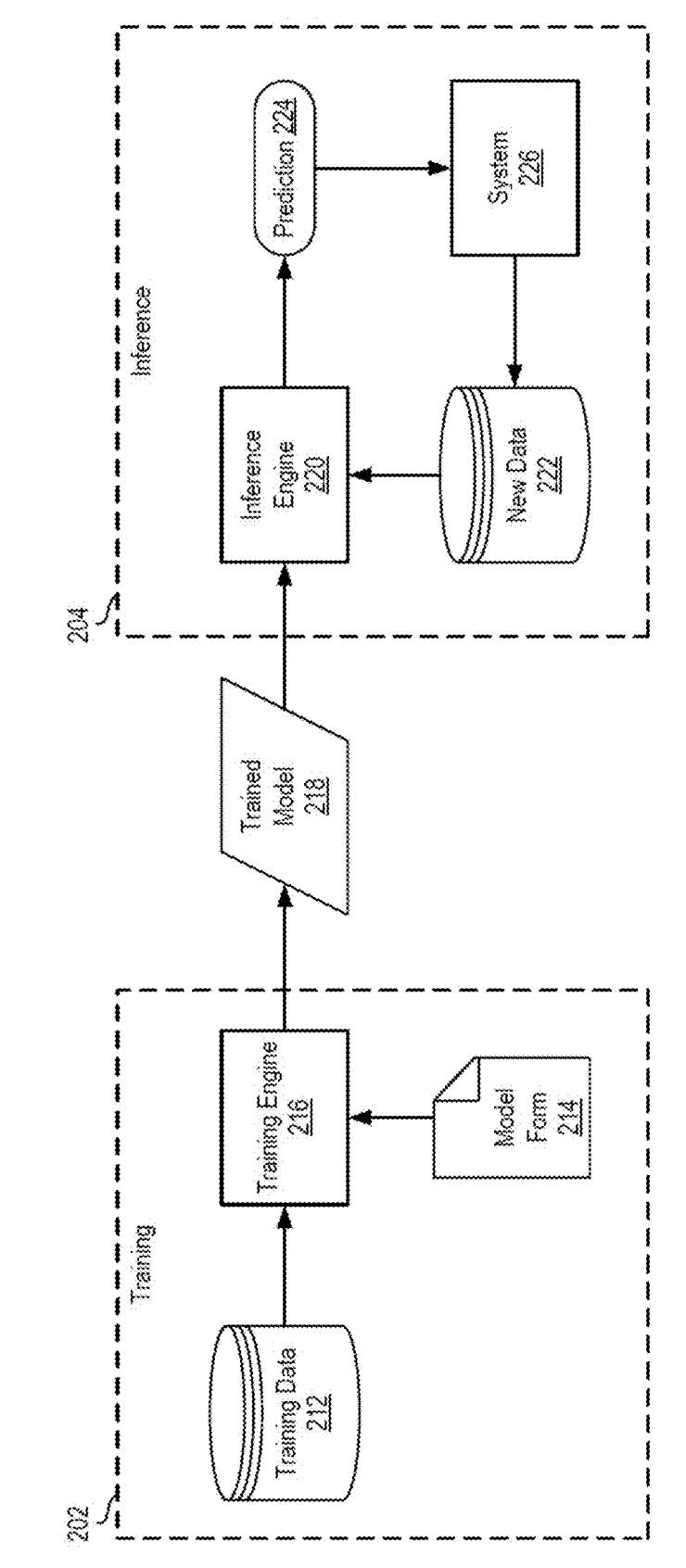
FIG. 2 depicts a block diagram of components of a machine learning training and inference system in accordance with one or more embodiments of the present disclosure.

Existing methods for providing alerts regarding a noise level at a location rely on microphones disposed in the location. While microphones, or other noise level sensing devices, provide an accurate reading of the noise level at a location, the use of such devices and the systems to monitor them add an additional cost and point of failure. In addition, microphones can only accurately measure the sound level at its location and there are limitations as to where microphones can be placed. For example, microphones may be accidentally or intentionally unplugged or damaged and the microphones may require periodic calibration or other maintenance. The type and orientation of the microphone and the properties of the sound field can also lead to errant results from the microphone. Furthermore, the use of microphones in some locations may present privacy concerns, as the microphones could be used to monitor or record confidential information.

In exemplary embodiments, systems and methods for providing alerts regarding an estimated noise level at a location that does not utilize microphones are provided. In exemplary embodiments, a noise level model is created for a location. In exemplary embodiments, the noise level model is a trained model is configured to receive inputs of the operational characteristics of one or more noise generating pieces of equipment in the location and to responsively output an estimated noise level in the location. The estimated noise level in the location is then compared to one or more threshold levels and one or more alerts are provided that indicate a risk level associated with exposure to the total estimated noise level in the location. The risk level can be associated with a health-related risk and/or a concentration-related risk associated with exposure to the total estimated noise level. In exemplary embodiments, the one or more alerts may include one or more visual alerts, haptic alerts, and/or audio alerts. In one example a user wearing a device that vibrates when it is near the target position and the total estimated noise level is over a threshold level.

In exemplary embodiments, the noise level model is created for the location by combining one or more acoustic models, which each correspond to a piece of noise generating equipment in the location. The acoustic model for each piece of noise generating equipment is created by monitoring and recording a noise level generated during various operating states of the piece of noise generating equipment.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as providing alerts of an estimated noise at a location, as shown at block 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer, a small single board computer (e.g. a Raspberry Pi) or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages the sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after the instantiation of the VCE. Cloud orchestration module 131 manages the transfer and storage of images, deploys new instantiations of VCEs, and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community, or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful for tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Systems for training and using a machine learning model are now described in more detail with reference to FIG. 2. Particularly, FIG. 2 depicts a block diagram of components of a machine learning training and inference system 200 according to one or more embodiments described herein. The system 200 performs training 202 and inference 204. During training 202, a training engine 216 trains a model (e.g., the trained model 218) to perform a task, such as estimating a noise generated by a piece of noise generating equipment based on the operating characteristics of the piece of noise generating equipment. Inference 204 is the process of implementing the trained model 218 to perform the task, such as estimating a noise generated by a piece of noise generating equipment based on the operating characteristics of the piece of noise generating equipment, in the context of a larger system (e.g., a system 226). All or a portion of the system 200 shown in FIG. 2 can be implemented, for example by all or a subset of the computing environment 100 of FIG. 1.

The training 202 begins with training data 212, which may be structured or unstructured data. According to one or more embodiments described herein, the training data 212 includes recorded noise levels generated by a piece of noise generating equipment and the operational characteristics of the piece of noise generating equipment corresponding to the recorded noise level, (i.e., the operational characteristics at the time that the noise level was recorded). The training engine 216 receives the training data 212 and a model form 214. The model form 214 represents an untrained base model. The model form 214 can have preset weights and biases, which can be adjusted during training. It should be appreciated that the model form 214 can be selected from many different model forms depending on the task to be performed. For example, where the training 202 is to train a model to perform image classification, the model form 214 may be a model form of a CNN. The training 202 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 212 includes labeled images, including images of the object of interest with associated labels (ground truth) and other images that do not include the object of interest with associated labels. In this example, the training engine 216 takes as input a training image from the training data 212, makes a prediction for classifying the image, and compares the prediction to the known label. The training engine 216 then adjusts weights and/or biases of the model based on the results of the comparison, such as by using backpropagation. The training 202 may be performed multiple times (referred to as "epochs") until a suitable model is trained (e.g., the trained model 218).

Once trained, the trained model 218 can be used to perform inference 204 to perform a task, such as estimating a noise generated by a piece of noise generating equipment based on the operating characteristics of the piece of noise generating equipment. The inference engine 220 applies the trained model 218 to new data 222 (e.g., real-world, non-training data). For example, if the trained model 218 is trained to classify images of a particular object, such as a chair, the new data 222 can be an image of a chair that was not part of the training data 212. In this way, the new data 222 represents data to which the model 218 has not been exposed. The inference engine 220 makes a prediction 224 (e.g., a classification of an object in an image of the new data 222) and passes the prediction 224 to the system 226. The system 226 can, based on the prediction 224, take an action, perform an operation, perform an analysis, and/or the like, including combinations and/or multiples thereof. In some embodiments, the system 226 can add to and/or modify the new data 222 based on the prediction 224.

In accordance with one or more embodiments, the predictions 224 generated by the inference engine 220 are periodically monitored and verified to ensure that the inference engine 220 is operating as expected. Based on the verification, additional training 202 may occur using the trained model 218 as the starting point. The additional training 202 may include all or a subset of the original training data 212 and/or new training data 212. In accordance with one or more embodiments, the training 202 includes updating the trained model 218 to account for changes in expected input data.

Figure 3:
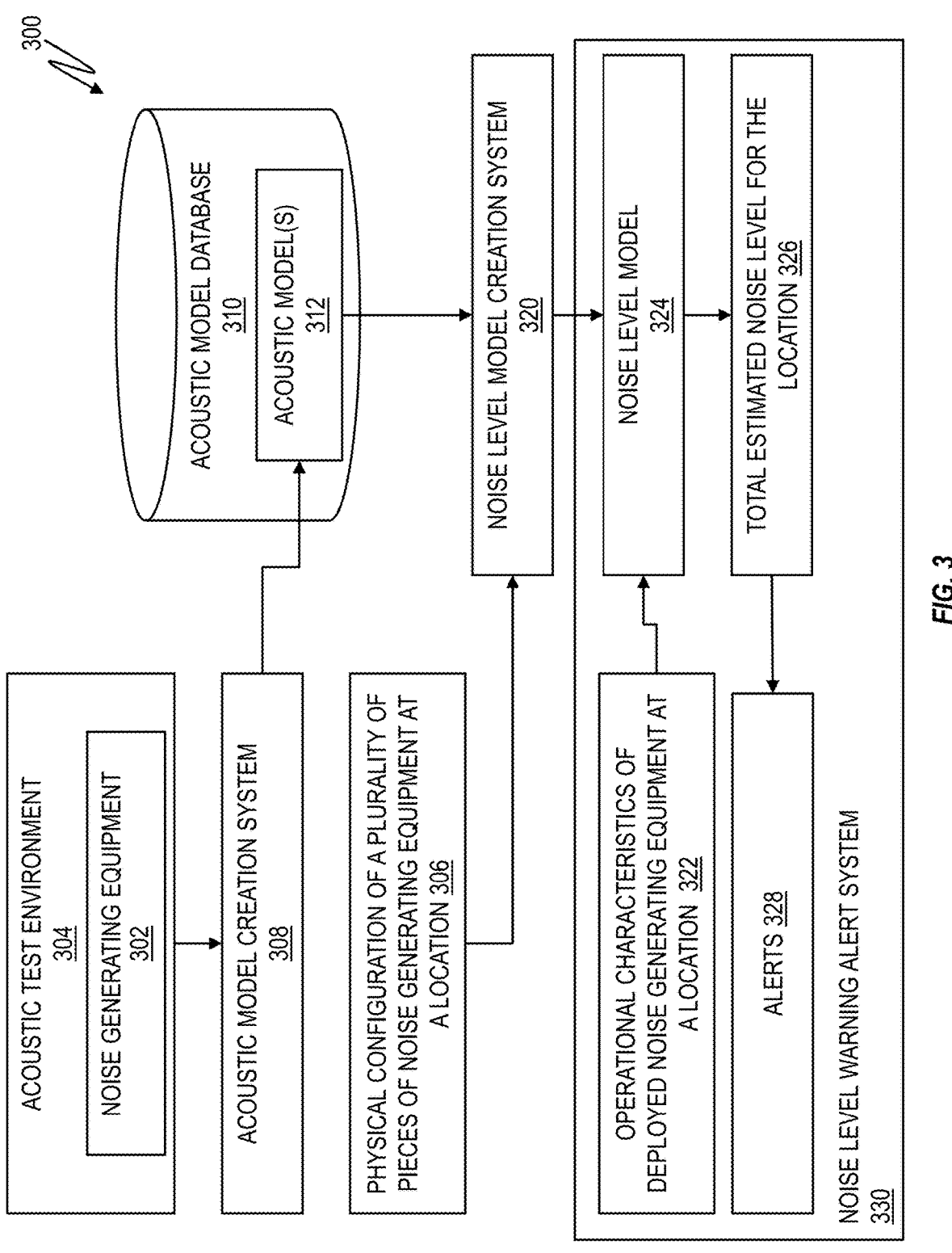
FIG. 3 depicts a block diagram of a system for providing alerts of an estimated noise in a location in accordance with one or more embodiments of the present disclosure.

Referring now to FIG. 3, a block diagram of a system 300 for providing alerts of an estimated noise at a location in accordance with one or more embodiments of the present disclosure is shown. In exemplary embodiments, the system 300 includes an acoustic test environment 304 in which one or more pieces of noise generating equipment 302 are tested. Testing the pieces of noise generating equipment 302 includes controlling one or more operational characteristics of the noise generating equipment 302 and measuring noise levels generated by the noise generating equipment 302 associated with the various operational characteristics. In exemplary embodiments, the operational characteristics of the noise generating equipment 302 may include, but are not limited to, a fan speed, a power consumption level, a processing speed, and a temperature of the noise generating equipment 302. In one example, a combination of fan speed and power consumed by the noise generating equipment can be to infer another operational characteristic, the airflow impedance of the noise generating equipment, which cannot be measured directly.

The system 300 also includes an acoustic model creation system 308 that is configured to create acoustic models 312 for each of the pieces of noise generating equipment 302 based on the measured noise levels and the operational characteristics. The acoustic models 312 are configured to evaluate the effects of the various operational characteristics both independently and in combination with one another. For example, while fan speed and power draw can each, independently provide helpful input to the model, the simultaneous readings of fan speed and power draw can be used to deduce other parameters, like the system impedance (airflow resistance) of the equipment, which in turn can be factored into the predictive acoustical model. In one embodiment, the acoustic model creation system 308 is a machine learning training and inference system 200, such as the one shown in FIG. 2. In another embodiment, the acoustic model creation system 308 is based direct measurement data and interpolation between locations as well as operational characteristics. Once an acoustic model 312 is created for a piece of noise generating equipment 302, the acoustic model 312 is stored in an acoustic model database 310.

In exemplary embodiments, the acoustic model 312 created for a piece of noise generating equipment 302 may be utilized for another piece of noise generating equipment 302 that is substantially similar to the piece of noise generating equipment 302 for which the acoustic model 312 was created. For example, the acoustic model 312 may be made of a first version of a piece of noise generating equipment 302 and also be used to for a second version of the piece of noise generating equipment 302. In one example, acoustic model 312 may exist for the acoustical directivity of a specific type of fan (e.g. counter-rotating) in the front of a rack-mounted server. The acoustic model 312 may be robust to well represent all fans of this type as far as how much the acoustical energy declines as the angle of propagation diverges from the central axis of the fan. Therefore, for each new product model coming to market, it may only be necessary to measure the acoustical noise emission at several key locations and then fit that data to this existing model for counter-rotating fan noise directivity.

In exemplary embodiments, the system 300 also includes a noise level model creation system 320 that is configured to create a noise level model 324 for a location The noise level model creation system 320 is configured to receive a physical configuration 306 of one or more of pieces of noise generating equipment at a location and one or more of acoustic models 312. The noise level model creation system 320 is configured to create a noise level model 324 for the location based on the physical configuration 306 and acoustic models 312. For example, the noise level model creation system 320 is configured to combine the expected noise levels generated by the acoustic models 312 based on the physical proximity of the equipment, the directivity profile of the pieces of equipment and based on the type of enclosures the pieces of equipment are disposed in.

In exemplary embodiments, the physical configuration 306 of the one or more of pieces of noise generating equipment at the location includes a type of each of the one or more of pieces of noise generating equipment at the location and a number of each type of piece of noise generating equipment. The physical configuration 306 also includes a relative location of each of the one or more of pieces of noise generating equipment and one or more enclosure types that contain one or more of the one or more of pieces of noise generating equipment. In one example, the pieces of noise generating equipment 302 are various pieces of IT equipment such as servers and routers that are disposed in one or more server racks or cabinets. In this example, the physical configuration would include an identification of each piece of IT equipment, a type or configuration of each server rack or cabinet, type and placement of fans in the server rack, and the placement of the pieces of IT equipment in the server racks or cabinets. In one embodiment, the enclosure type includes an indication of whether the enclosure has a sound transmission altering cover or door. As used herein, a sound transmission altering cover is any cover, door, or enclosure that reduces, alters, changes or redirects the transmission of sound. In these embodiments, a sensor is configured to monitor the state of the sound transmission altering door or cover, and the noise level model 324 incorporates the state of the sound transmission altering door or cover.

In exemplary embodiments, the noise level model creation system 320 is deployed on, or in communication with, a noise level warning alert system 330. The level model creation system 320 is configured to receive operational characteristics 322 of deployed noise generating equipment at the location. The operational characteristics 322 of deployed noise generating equipment are received from the deployed noise generating equipment and/or one or more sensors disposed at the location. Based on the operational characteristics 322 the trained level model creation system 320 generates a total estimated noise level 326 for the location. In exemplary embodiments, the total estimated noise level 326 is an expected decibel level at one or more specified points at the location.

The noise level warning alert system 330 is also configured to generate and/or activate one or more alerts 328 that indicate a risk level associated with exposure to the total estimated noise level at the location. In one embodiment, the risk level associated with exposure to the total estimated noise level at the location is determined by comparing the one or more total estimated noise levels 326 to one or more threshold values. The risk level can be associated with a health-related risk and/or a concentration-related risk associated with exposure to the total estimated noise level. A health-related risk can include hearing loss or hypertension and a concentration-related risk can include a risk of communication error because of impaired speech intelligibility or the risk of lowered productivity due to lapses in concentration or annoyance from the total estimated noise level. In one embodiment, the one or more alerts 328 may include one or more of visual, haptic, and/or auditory alerts. In one embodiment, the visual display is configured to convey the risk level. For example, the visual display may include a plurality of different lights that are activated based on the risk level. In another example, the visual display may include one or more signs or infographics conveying the risk level. In a further example, the visual display may include a textual alert. In one embodiment, the risk level includes the amount of time that it is considered to be safe to be at the location. For example, the risk level may indicate that spending more than one hour at the location may be dangerous. In one embodiment, the alert is an auditory alert that has one or more of a frequency and intensity that is positively correlated to the risk level. For example, the alert may be a beeping sound that increases in frequency and/or intensity as the risk level increases.

Referring now to FIG. 4, a flowchart of a method for creating a noise level model for a location in accordance with one or more embodiments of the present disclosure is shown. In one embodiment, the method 400 is performed by a noise level model creation system 320, such as the one shown in FIG. 3. As shown at block 402, the method 400 includes identifying one or more of pieces of noise generating equipment at the location. In one example, the one or more of pieces of noise generating equipment are identified by a system administrator that is configuring the location. Identifying the one or more of pieces of noise generating equipment at the location includes identifying a type and number of each of the pieces of noise generating equipment at the location. Next, as shown at block 404, the method 400 includes obtaining an acoustic model for each of the one or more of pieces of noise generating equipment at the location. In exemplary embodiments, the acoustic models for the one or more of pieces of noise generating equipment are obtained from an acoustic model database 310.

The method 400 also includes obtaining a physical configuration of the one or more of pieces of noise generating equipment at the location, as shown at block 406. In exemplary embodiments, the physical configuration of the one or more of pieces of noise generating equipment includes a type of each of the one or more of pieces of noise generating equipment at the location and a number of each type of piece of noise generating equipment at the location. The physical configuration also includes a relative location of each of the one or more of pieces of noise generating equipment and one or more enclosure types that contain one or more of the pieces of noise generating equipment. In one example, the physical configuration is obtained from a system administrator who is configuring the location. Next, as shown at block 408, the method 400 includes creating a noise level model for the location by combining the acoustic models for each of the one or more of pieces of noise generating equipment based on the physical configuration of the one or more of pieces of noise generating equipment at the location.

Figure 5:
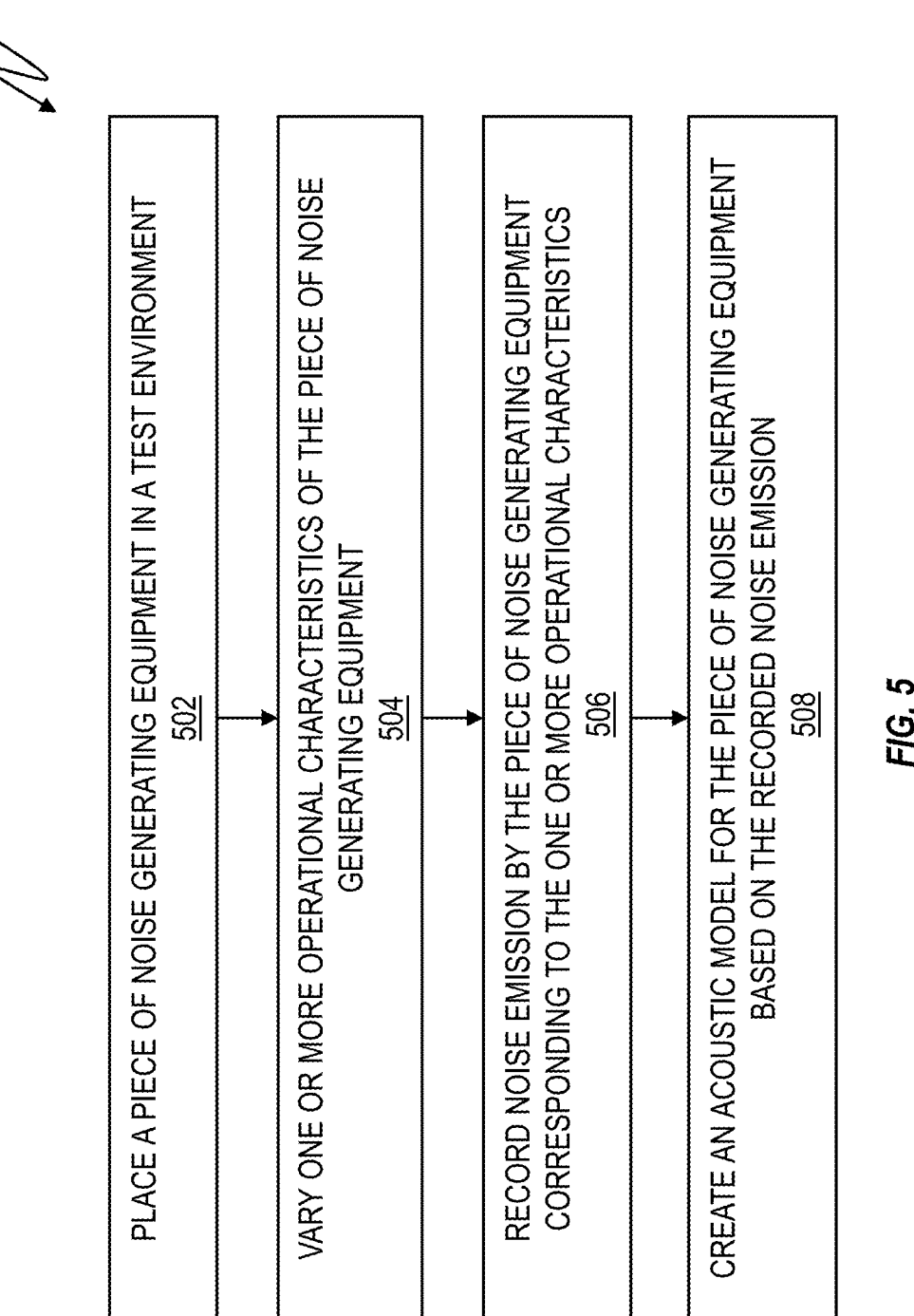
FIG. 5 depicts a flowchart of a method for creating an acoustic model for a piece of noise generating equipment in accordance with one or more embodiments of the present disclosure.

Referring now to FIG. 5, a flowchart of a method for creating an acoustic mode for a piece of noise generating equipment in accordance with one or more embodiments of the present disclosure is shown. In one embodiment, the method 500 is performed by an acoustic model creation system 308, such as the one shown in FIG. 3. As shown at block 502, the method 500 includes placing a piece of noise generating equipment in a test environment. Next, as shown at block 504, the method 500 includes varying one or more operational characteristics of the piece of noise generating equipment. In exemplary embodiments, the operational characteristics of the piece of noise generating equipment may include, but are not limited to, a fan speed, a power consumption level, a processing speed, and a temperature of the noise generating equipment. In some embodiments, there may also be different types of sources of noise within the noise generating equipment that vary independently. For example, a server may have a set of smaller power supply fans and larger cooling fans. These may be in separate locations and operate at independent speeds wherein some scenarios may cause one of the sets of fans to change but not the other. The acoustic model would recognize and account for these differences between the different sources.

As shown at block 506, the method 500 also includes recording a noise generation by the piece of noise generating equipment corresponding to the one or more operational characteristics. For example, a noise emission level is recorded when a fan of a piece of noise generating equipment is off, when the fan is operating at fifty percent power, and when the fan is operating at full power. The method 500 also includes creating an acoustic model for the piece of noise generating equipment based on the recorded noise emission, as shown at block 508. In exemplary embodiments, the acoustic model may be a regression model, a model created by a machine learning training and inference system, a model based on interpolation, a model based on scientific theory, or another suitable model that is configured to output an estimated noise generation level for a piece of noise generating equipment based on input operational characteristics of the piece of noise generating equipment.

Referring now to FIG. 6, a flowchart of a method for providing alerts of an estimated noise at the location in accordance with one or more embodiments of the present disclosure is shown. In one embodiment, the method 600 is performed by a noise level warning alert system 330, such as the one shown in FIG. 3. As shown at block 602, the method 600 includes receiving operational characteristics from each of a one or more of pieces of noise generating equipment deployed at the location. Next, as shown at block 604, the method 600 includes inputting the operational characteristics into a noise level model corresponding to the location. In exemplary embodiments, the noise level model is also configured to receive state information regarding one or more sound attenuating doors or covers disposed at the location from one or more sensors at the location.

Next, as shown at block 606, the method 600 includes receiving a total estimated noise level for the location from the noise level model. In one embodiment, the total estimated noise level is provided as an estimated decibel level at a specified location at the location. The method 600 also includes comparing the total estimated noise level to one or more threshold levels, as shown at block 608. In exemplary embodiments, the one or more threshold levels may be specified by an administrator in charge of the location. The method 600 also includes activating one or more alerts based on the comparison, where the one or more alerts indicate a risk level associated with exposure to the total estimated noise level at the location.

In exemplary embodiments, the noise level model includes one or more environmental adjustment factors that are configured to modify the total estimated noise level. In one embodiment, the one or more environmental adjustment factors are set by a system administrator after the installation of one or more of pieces of noise generating equipment at the location. In one example, the one or more environmental adjustment factors may indicate sound propagation or attenuation factors of the environment, such as the type of flooring, sound damping materials, or the like. For example, the one or more environmental adjustment factors may be used to increase or decrease the total estimated noise level by a fixed amount or percentage that is set by the system administrator. The one or more environmental adjustment factors may be attained via an initial measurement or via a calibration. The one or more environmental adjustment factors may also be made by a user based on one or more assumptions based on nearby material types and spacing of equipment and surfaces.

In exemplary embodiments, the noise level model is validated in-situ via a microphone measurement. In these embodiments, the noise level model is calibrated after installation of the noise generating equipment at the location to account for the reflected noise (reverberations) in the installation environment. In one example, a noise level model is created but not validated for accuracy until the noise generating equipment is placed in the intended installation environment. At this stage of implementation, multiple acoustical measurements can be acquired using a microphone to validate and tune the accuracy of the noise level model over a range of operating characteristics. Once the calibration of the noise level model is complete, the microphone is removed and a permanent microphone is not present in the installation environment.

In exemplary embodiments, the noise level model may be configured to predict one or more noise levels. For example, the noise level model may be configured to predict noise levels at different locations within an installation environment (e.g., at the front, rear and sides of the device). In one embodiment, the creation and transmission of the alerts may be based on the highest of those predicted levels. In another embodiment, multiple alerts can be created and provided at different locations corresponding to the locations of the respective predictions that triggered the alerts.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for providing alerts of an estimated noise in a location, the method comprising:

receiving operational characteristics from each of one or more of pieces of noise generating equipment in the location, the operational characteristics including at least one of a fan speed, a power consumption level, a processing speed, and a temperature associated with the piece of noise generating equipment, the operational characteristics received from the deployed noise generating equipment and/or one or more sensors disposed at the location;

inputting the operational characteristics into respective acoustic models corresponding the one or more of pieces of noise generating equipment, each acoustic model configured to output a noise emission level for the corresponding piece of noise generating equipment;

inputting the noise emission levels output by the respective acoustic models into a noise level model corresponding to the location;

receiving, from the noise level model, a total estimated noise level for the location, wherein the noise level model combines the noise emission levels according to a physical configuration of the one or more pieces of noise generating equipment in the location;

comparing the total estimated noise level to one or more threshold levels; and activating one or more alerts based on the comparison, wherein the one or more alerts indicate a risk level associated with exposure to the total estimated noise level, wherein the method does not utilize microphones during normal operation, and the noise level model is validated in-situ via a microphone measurement and a permanent microphone is not present in the installation environment.

2. The computer-implemented method of claim 1, wherein one or more of the one or more of pieces of noise generating equipment are pieces of information technology equipment and the operational characteristics include one or more of a fan speed, a power consumption level, a processing speed, and a temperature associated with the piece of noise generating equipment.

3. The computer-implemented method of claim 1, wherein the physical configuration of the one or more of pieces of noise generating equipment in the location includes a number of the one or more of pieces of noise generating equipment, a type of each of the one or more of pieces of noise generating equipment, a relative location of each of the one or more of pieces of noise generating equipment, and one or more enclosure types that contain one or more of the one or more of pieces of noise generating equipment.

4. The computer-implemented method of claim 3, wherein the enclosure type indicates whether enclosure has a sound transmission altering cover, wherein a sensor is configured to monitor a state of the sound transmission altering cover, and wherein the method further comprises inputting the state of the sound transmission altering cover into the noise level model.

5. The computer-implemented method of claim 1, wherein the noise level model includes one or more environmental adjustment factors that are configured to modify the total estimated noise level, wherein the one or more environmental adjustment factors are set by a system administrator after installation of one or more of pieces of noise generating equipment in the location.

6. The computer-implemented method of claim 1, wherein the one or more alerts include a visual display that is configured to convey the risk level.

7. The computer-implemented method of claim 1, wherein the one or more alerts include one of an audio alert and a haptic alert.

8. A computing system having a memory having computer readable instructions and one or more processors for executing the computer readable instructions, the computer readable instructions controlling the one or more processors to perform operations comprising:

receiving operational characteristics from each of one or more of pieces of noise generating equipment in a location, the operational characteristics including at least one of a fan speed, a power consumption level, a processing speed, and a temperature associated with the piece of noise generating equipment, the operational characteristics received from the deployed noise generating equipment and/or one or more sensors disposed at the location;

inputting the operational characteristics into respective acoustic models corresponding the one or more of pieces of noise generating equipment, each acoustic model configured to output a noise emission level for the corresponding piece of noise generating equipment;

inputting the noise emission levels output by the respective acoustic models into a noise level model corresponding to the location;

receiving, from the noise level model, a total estimated noise level for the location, wherein the noise level model combines the noise emission levels according to a physical configuration of the one or more pieces of noise generating equipment in the location;

comparing the total estimated noise level to one or more threshold levels; and activating one or more alerts based on the comparison, wherein the one or more alerts indicate a risk level associated with exposure to the total estimated noise level, wherein the method does not utilize microphones during normal operation, and the noise level model is validated in-situ via a microphone measurement and a permanent microphone is not present in the installation environment.

9. The computing system of claim 8, wherein one or more of the one or more of pieces of noise generating equipment are pieces of information technology equipment and the operational characteristics include one or more of a fan speed, a power consumption level, a processing speed, and a temperature associated with the piece of noise generating equipment.

10. The computing system of claim 8, wherein the physical configuration of the one or more of pieces of noise generating equipment in the location includes a number of the one or more of pieces of noise generating equipment, a type of each of the one or more of pieces of noise generating equipment, a relative location of each of the one or more of pieces of noise generating equipment, and one or more enclosure types that contain one or more of the one or more of pieces of noise generating equipment.

11. The computing system of claim 10, wherein the enclosure type indicates whether enclosure has a sound transmission altering cover, wherein a sensor is configured to monitor a state of the sound transmission altering cover, and wherein the method further comprises inputting the state of the sound transmission altering cover into the noise level model.

12. The computing system of claim 8, wherein the noise level model includes one or more environmental adjustment factors that are configured to modify the total estimated noise level, wherein the one or more environmental adjustment factors are set by a system administrator after installation of one or more of pieces of noise generating equipment in the environment.

13. The computing system of claim 8, wherein the one or more alerts include a visual display that is configured to convey the risk level.

14. The computing system of claim 8, wherein the one or more alerts include one or more of an audio alert and a haptic alert.

15. A computer program product comprising a computer readable storage medium having program instructions embodied therewith, the program instructions executable by a processor to cause the processor to perform operations comprising:

receiving operational characteristics from each of one or more of pieces of noise generating equipment in a location, the operational characteristics including at least one of a fan speed, a power consumption level, a processing speed, and a temperature associated with the piece of noise generating equipment, the operational characteristics received from the deployed noise generating equipment and/or one or more sensors disposed at the location;

inputting the operational characteristics into respective acoustic models corresponding the one or more of pieces of noise generating equipment, each acoustic model configured to output a noise emission level for the corresponding piece of noise generating equipment;

inputting the noise emission levels output by the respective acoustic models into a noise level model corresponding to the location;

receiving, from the noise level model, a total estimated noise level for the location, wherein the noise level model combines the noise emission levels according to a physical configuration of the one or more pieces of noise generating equipment in the location;

comparing the total estimated noise level to one or more threshold levels; and activating one or more alerts based on the comparison, wherein the one or more alerts indicate a risk level associated with exposure to the total estimated noise level, wherein the method does not utilize microphones during normal operation, and the noise level model is validated in-situ via a microphone measurement and a permanent microphone is not present in the installation environment.

* * * * *